United States Patent [19]

Carpenter et al.

[11] Patent Number: 5,012,382
[45] Date of Patent: Apr. 30, 1991

[54] LOW IMPEDANCE POWER CONDITIONER APPARATUS AND METHOD

[75] Inventors: William D. Carpenter, Del Mar; Randy J. Redding; Robert C. McLoughlin, both of San Diego, all of Calif.

[73] Assignee: Teal Electronics Corporation, San Diego, Calif.

[21] Appl. No.: 537,579

[22] Filed: Jun. 14, 1990

[51] Int. Cl.$^5$ ............................................. H02H 7/20
[52] U.S. Cl. ........................................................ 361/93
[58] Field of Search ...................................... 361/35–38, 361/93, 94

[56] References Cited

U.S. PATENT DOCUMENTS

| | | | |
|---|---|---|---|
| 3,793,559 | 2/1974 | Ristuccia | 361/36 |
| 3,857,068 | 12/1974 | Braunstein | 361/37 |
| 3,858,130 | 12/1974 | Misencik | 335/18 |
| 4,053,778 | 10/1977 | Franke | 250/402 |
| 4,481,553 | 11/1984 | Owen et al. | 361/93 |
| 4,540,930 | 9/1985 | Siedband | 322/4 |
| 4,653,082 | 3/1987 | Tsuchiya | 378/101 |
| 4,737,878 | 4/1988 | Mikulecky | 361/37 |
| 4,856,036 | 8/1989 | Malcolm et al. | 378/116 |
| 4,868,462 | 9/1989 | Chattin | 315/277 |
| 4,901,182 | 2/1990 | Book | 361/38 |
| 4,933,799 | 6/1990 | Lai | 361/25 |

Primary Examiner—Donald A. Griffin
Attorney, Agent, or Firm—Baker, Maxham, Jester & Meador

[57] ABSTRACT

A deliberately undersized power conditioner circuit for high peak power, low duty cycle equipment. The circuit may be connected with a thermal switch to shut off the power if the transformer gets too hot. The transformer has low impedance and by being undersized saves cost and improves power quality to sensitive electronic systems.

39 Claims, 2 Drawing Sheets

LOW IMPEDANCE POWER CONDITIONER APPARATUS AND METHOD

FIELD OF THE INVENTION

This invention relates generally to power conditioners and more particularly to a low impedance power conditioner to provide high purity electrical power for brief periods of time, the low impedance transformer being deliberately undersized by a factor of 2 to 1 or more, compared with the power rating of the load.

BACKGROUND OF THE INVENTION

High purity electrical power generally means that the power is free from voltage spikes and sags with zero neutral-ground voltage. A number of electronic devices require such high purity power. Among them, in particular, are medical imaging systems such as X-ray, computerized tomography, magnetic resonance imaging, and radiation treatment systems. All of these systems require a large amount of current but only for a short duration when the X-ray or magnetic generator is operational. The power during this exposure must be clean for good image quality. Additionally, the stand-by power between exposures must also be clean for the reliable operation of the computerized control and image processing subsystems which operate between exposures.

For these types of systems, it is also very important that the voltage drop during exposure be minimal, typically less than eight percent. This includes the impedance of all upstream wiring, connections and transformers. The reason is that the exposure duration is calculated on line voltage present immediately before exposure. Significant changes during exposure could result in unpredictable dosages. It is also important that operation of the generator does not create voltage sags or spikes which interfere with the reliable operation of other system components.

The National Electric Code (NEC) requires that circuit breakers feeding the circuit powering an X-ray system be sized for at least 50% of the maximum current draw of the system. This forces the use of larger building wiring which achieves lower impedance and reduces the possibility that the breaker could fuse closed.

Various methods have been employed to satisfy the requirements of the electronic equipment mentioned above. The most common method to power these systems is to run large size, dedicated wiring from the building service entrance. In an effort to minimize neutral-ground voltages, this wiring often has a full-size neutral and ground. Since this is a computer-type load, it is possible that there could be requirements to oversize the neutral compared with phase conductors. There is little effective isolation from the rest of the building and the power quality that results with this "solution" is low.

Another way to achieve the desired power quality is to use surge suppression devices or L-C filters, or both, on the building wiring near the load. These devices shunt impulses above certain voltage or frequency levels from one wire to another. They typically comprise metal oxide varistors (MOV's), silicon avalanche diodes, gas discharge tubes, capacitors and inductors, and often incorporate resistors.

There are several limitations with these types of devices. One is that their effects are limited since they can only protect to a certain voltage or frequency level. MOV's and avalanche diodes "wear out" with time and lose their effectiveness. To the degree that these devices and filters shunt away voltage spikes or dips ("normal mode noise"), they dump them onto the neutral conductor, creating neutral-ground potentials ("common mode noise") which are even more damaging or disruptive than normal mode noise.

To be effective, the inductance between the power line and the shunt elements (surge suppressors and capacitors in L-C filters) must be minimized. Each foot of wire length connecting the "suppressors" to the conductors makes a measurable difference in their effectiveness. Often these devices are connected to the power lines by wires which are 5 to 50 feet in length due to physical placement constraints in the field or limited knowledge on the part of the installers, or both.

Another alternative solution is to use a conventional shielded isolation transformer. The transformer allows a new neutral to be derived on its load side, which means that the input ground can be reduced in size to code minimums, and no input neutral needs to be run at all to the transformer. The shield in the transformer increases the isolation of the output from the conducted ground (common mode) noise. The fresh neutral-ground bond converts common mode noise to normal mode noise and allows a more effective use of filters and surge suppressors on the transformer secondary as described above. A disadvantage of conventional transformers is that the added impedance of the transformer means that input wiring needs to be increased in size so that total impedance to the load would still be low enough. For that reason, as well as the NEC limitation on the minimum size for main breakers, this isolation transformer needs to be sized for at least 50% of the momentary load, and typically 70-100%. That means it sits idling at about 10% or less of its rated power, wasting money, space and generating objectionable heat and noise which prevent it from being located near the electronic equipment which it powers.

The extra impedance of the shielded isolation transformer also results in lower power quality when it interacts with computer loads. Modern computers have "switch mode" power supplies which draw their current in short bursts where the change in current with respect to time (is/dT) is fast, being equivalent to 1 KHz instead of the usual 60 Hz for most conventional loads. Even at low load factors, conventional transformers have outputs with a flat-topped voltage waveform and have voltage spikes. Worse, when one of the many system loads switch on or off an even higher effective frequency is generated which results in even larger voltage spikes.

There are times that shielded isolation transformers and suppression/filtering devices are combined in the field in an attempt to provide the quality power desired. The limitations mentioned above apply to this combination.

Conventional voltage regulation devices cannot be used. Electronic-controlled tap-switching voltage regulators are undesirable because tap changes during exposure cannot be tolerated. Saturable-core ferroresonant transformers have very high impedance and slow reaction time. They interact with the pulsed load by creating large voltage transients.

SUMMARY OF THE INVENTION

A major purpose of the invention is to provide a transformer based power conditioner to supply a system having relatively high peak pulsed power requirements, such as 150 KVA, but with a low source impedance and a relatively small system size.

The invention accomplishes this purpose in a power conditioner circuit which includes a special type of isolation transformer which has a significantly lower than normal impedance measured both at 60 Hz and at higher frequencies. The transformer may include a shield between the primary and secondary windings and the circuit may include output L-C filters or suppression devices, or both. It has been found that low impedance conditioners of the type employed in this invention deliver significantly higher quality power to computerized electronic systems.

More specifically, the sizing and breakering of the conditioning system of the invention differs from conventional power conditioners. When considering how the low transformer impedance interacts with the high current/low duty cycle nature of the load, a much smaller power conditioner can be employed. The main input/output breakers must be sized to meet the NEC requirements, and those breaker sizes would normally be too large for the deliberately undersized low impedance transformer's steady state power rating. The system would be expected to burn up if it were overloaded to the extent allowed by the breakers. But a shunt-trip input breaker or other means can also be used with a thermal sensor which shuts off input power if the transformer temperature increases beyond a threshold level.

The "special" aspects of the transformer include one or more of the following methods to reduce impedance. One is to employ an interleaving technique coupled with multiple primary/secondary layers, which technique lowers the impedance by a factor of approximately the square of the number of layers, at least when there are two or three layers. Whereas conventional transformers require spaces between windings for cooling, the low impedance transformer of this invention employs minimum spacing between windings. That is, the windings should be as close as possible to achieve the desired effects. Another method for devising the low impedance transformer for optimum performance of the invention is to employ a high performance iron core. Also, toroidal transformers could be used.

BRIEF DESCRIPTION OF THE DRAWING

The objects, advantages and features of this invention will be more readily appreciated from the following detailed description, when read in conjunction with the accompanying drawing, in which.

DESCRIPTION OF THE PREFERRED EMBODIMENTS

Figure 1:
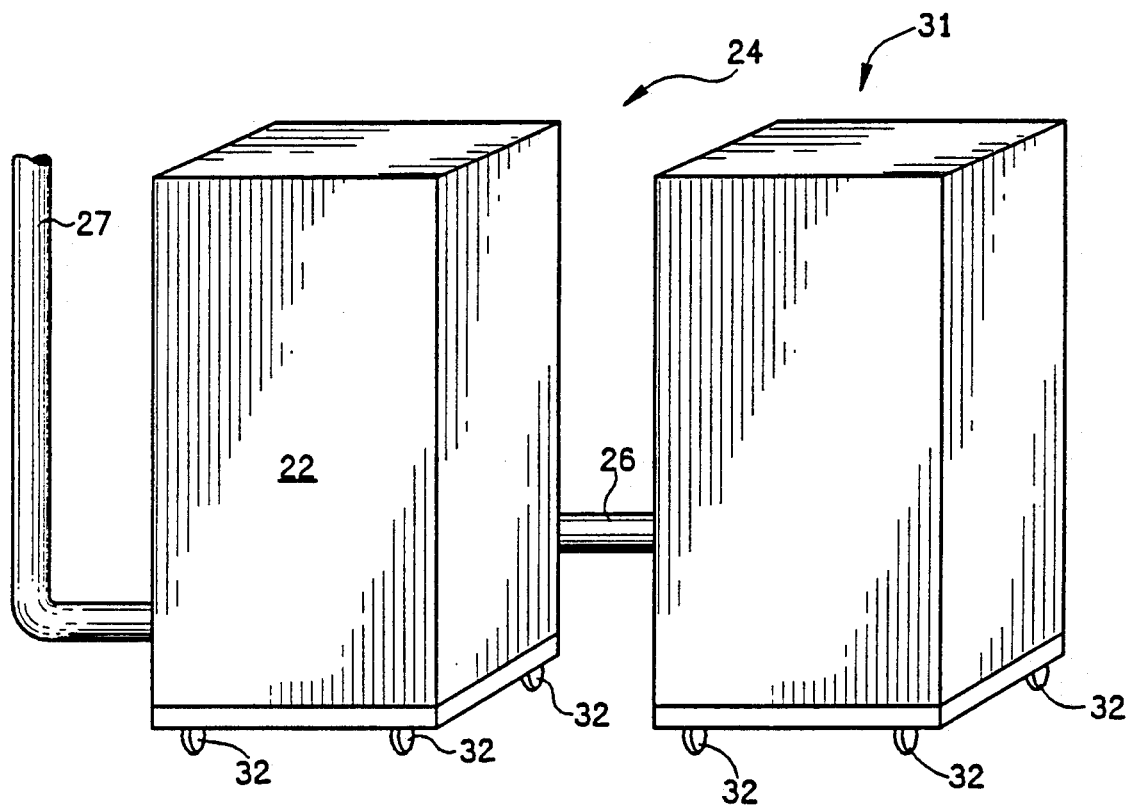
FIG. 1 is a perspective view of a typical load and a power distribution unit enclosure which contains the power conditioner circuit of the invention.

With reference now to the drawing, and more particularly to FIG. 1 thereof, there is shown cabinet 22 which houses the transformer circuit of the invention. Auxiliary circuits may also be contained within the enclosure. Incoming power enters the system through line 27. Output line 26 supplies conditioned power to the equipment, load 31, with which the power distribution unit is used. Cabinet 22 in which the power distribution unit is contained, and the powered equipment represented by enclosure 31, are preferably equipped with wheels and levelers 32 of standard configuration.

Figure 2:
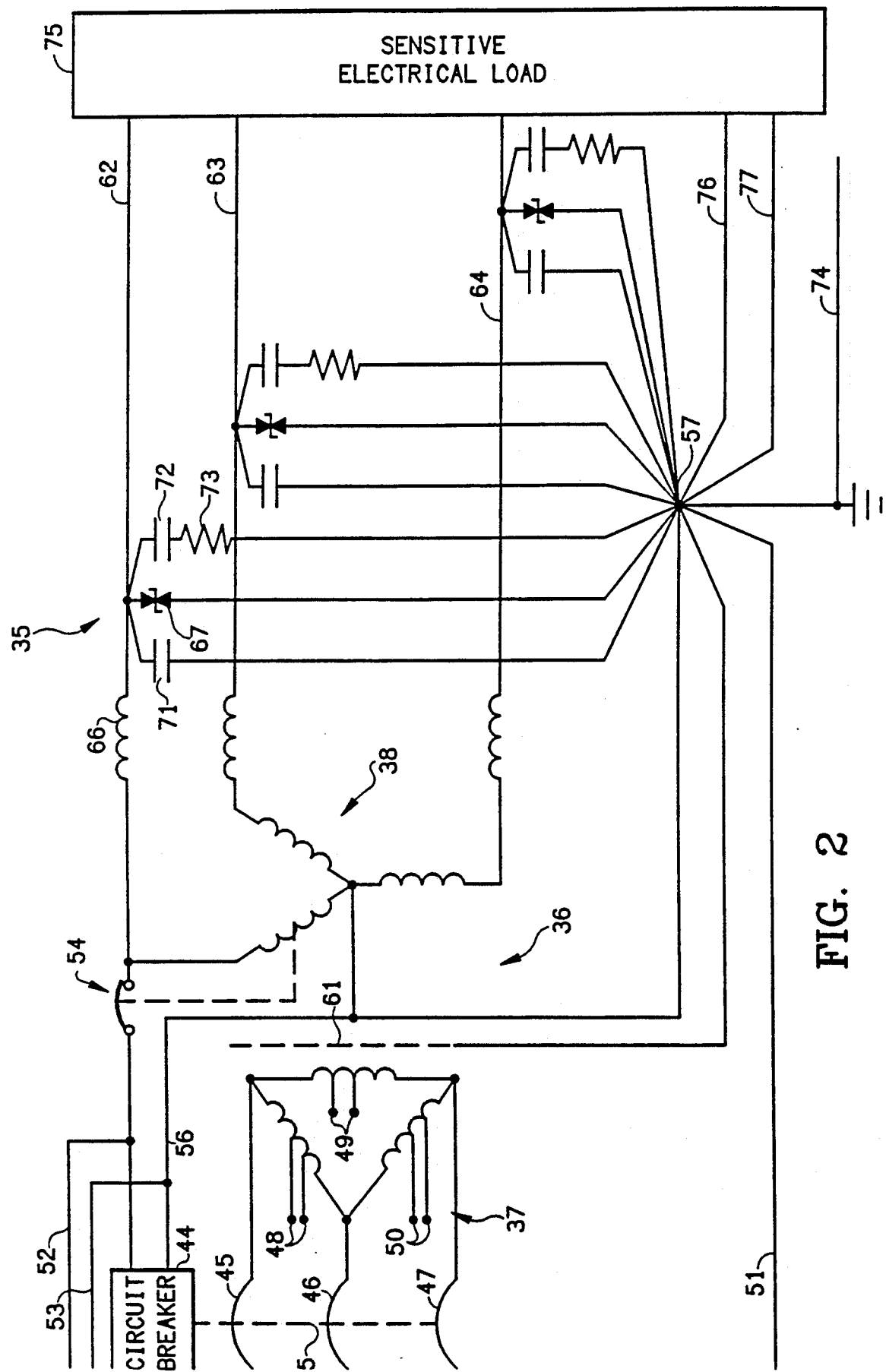
FIG. 2 is a schematic representation of the power conditioner of the invention, including various alternative components, showing how it would be connected to a sensitive electrical load.

Turning now to FIG. 2, there is shown power conditioning circuit 35 comprised partially of isolation transformer 36 formed of primary 37, secondary 38 and iron core 39. The input to primary 37 is comprised of input phase conductors 41, 42 and 43, each being subject to being disconnected by slow-blow circuit breaking elements 45, 46 and 47 in lines 41, 42, and 43, respectively. The circuit breaking elements are equipped with shunt-trip control 44. Line 51 is the input ground line and is the legal minimum in size in accordance with NEC standards. Lines 52 and 53 are connected to contacts for external emergency power off (EPO) control, a conventional requirement for such power supply systems. The transformer is equipped with taps 48, 49 and 50 off the primary windings. This enables the transformer to correct for chronic low or high line voltage by connecting the input phase conductors to the appropriate respective taps.

Thermal switch 54 provides over temperature protection of the power conditioner circuit. This switch is normally open when the circuit is operating. However, should the transformer overheat to a temperature at which the thermal switch is sensitive, the thermal switch will close, shutting off power, thereby preventing overheating. Thermally activated switch 54 may be a bimetallic device as indicated in FIG. 2 or it may be any thermally sensitive device which functions in the desired manner, switching input or output power. There are a variety of thermal or other interrupt methods in addition to the shunt-trip input breaker. For example, the breaker could be on the output. A breaker could be used which is directly sensitive to ambient temperature which would rise from the heat of an overloaded transformer. There are other possible non-thermal methods which could be used for detecting long term overloads.

Note that shunt-trip device 44 controls the circuit breaker. Dashed line 55 indicates a mechanical means for opening circuit breaking elements 45, 46 and 47. In an overheat situation thermal switch 54 and circuit breaker 44 operate together to remove input voltage.

The fact that transformer 36 could be a shielded isolation transformer is indicated by dashed line 61 representing a metal sheet positioned between the primary and secondary windings of the transformer.

Each output line 62, 63 and 64 of transformer secondary 38 includes L-R-C filters with surge suppression. For example, in line 62 is coil or inductance 66, either as a separate component or as the leakage inductance of transformer 36. Surge suppressor 67 could be a metal oxide varistor or a silicon avalanche diode which is connected in parallel with power line 62 to system ground 57. Capacitor 71 is also connected between power lines 62 and system ground as is the combination of capacitor 72 and resistor 73, connected in parallel with the surge suppressor and with capacitor 71. A similar filter and surge suppression structure is connected in power lines 63 and 64 and need not be discussed in detail here.

Ground line 74 is provided for supplemental ground if necessary, as may be required in some instances.

Sensitive electrical load 75 is the type of system discussed previously, which may be an X-ray machine, magnetic resonance imaging system or other system requiring high power for short durations. Output phase conductors 62, 63 and 64 are relatively large and quite short which provides higher power quality by minimizing impedance and pickup of radiated electrical noise. Lines 76 and 77 are oversized derived neutral and ground.

Transformer 36 has a steady state power rating many times lower than the maximum power required by the load. For example, if the load requires short duration pulses of 150KVA, transformer 36 is designed to be undersized by a factor of at least two to one so that its steady state rating would actually be 75 KVA or less. In actuality, the transformer steady state rating would most likely be in the range of 33-17% of the load's peak power so it could range from 50 KVA down to 25 KVA. This enables the low impedance transformer to be much smaller than a full sized conventional transformer which is larger, more expensive, hotter and acoustically noisier. Such full rated transformers, which have been used in the past for powering these types of systems, must usually be located outside of the electronic equipment room. By locating the transformer outside the room, other difficulties were created. One requirement for the medical systems mentioned above are that the main circuit breaker must be inside the room. With the old type of transformers located outside the room, additional expenses were necessitated by field mounting the breakers at a distance from the transformer.

The system of the invention is designed to work with pulse loads which may have durations ranging between one millisecond and three seconds. Slow-blow breakers of the type shown in FIG. 2 typically will not trip in less than three seconds at an overload of up to 500 percent.

By combining breakers of a size required by NEC standards (nominally too large for the steady state transformer rating) with some sort of power interrupt system together with the thermal shunt switch, the transformer can be greatly undersized for short duration pulse load requirements with a host of advantages stemming therefrom. These advantages are enumerated hereinbelow. One of them is that if the power conditioner circuit of FIG. 2 were accidentally connected to a high level steady load it would shut down before any damage could be done to the circuit. Thus it is self protecting for its intended purpose.

With respect to transformer 36 itself, one means of reducing the impedance while employing predetermined primary and secondary windings and core elements, is to interleave the primary and secondary windings. With three layers of each primary and secondary interleaved, the impedance of the transformer can be lowered to a fraction of what it would otherwise be. Toroidal transformers with bifilar windings of primary and secondary can also be used to lower transformer impedance.

Conventional transformers tend to create a substantial amount of resistive heating, so spaces between windings are necessary for cooling circulation. By contrast, the transformer of this invention is tightly wound, with no spacers, thereby reducing impedance.

The core of the transformer employs high permeability iron elements which are made of mechanically precise, thin sheets so that they stack with minimum air gaps. Additionally, the sheets are stacked in a one-on-one pattern instead of, for example, three-on-three, which tends to increase air gaps. The high permeability iron core employs grain oriented iron, whereas many other power transformers use lower grade non-grain oriented iron sheets.

There are many advantages to the power conditioning circuit of this invention. This power conditioner provides cleaner power than any known approach, no matter the size or rating of the transformers. The circuit of FIG. 2 attenuates incoming or line-side disturbances with the transformer's leakage inductance, the transformer shield, the L-R-C voltage filters and the surge suppressors installed within inches of the output phase conductors. Note that in prior systems where the transformer is located outside of the room in which the load is positioned, and for esthetic purposes, filters and surge suppressors would often be located between 5 and 50 feet from the output line.

By having a smaller system doing the same job, all of it can be put into a single cabinet, as shown in FIG. 1, and thereby all of the system elements, including breakers and surge suppressors, to name a few, can be located within a very short distance of each other and the load. This results in cleaner power and lower installation costs.

Output, or load generated, disturbances are also attenuated by the low transformer impedance and output filters. This helps decouple various connected loads. The low impedance neutral-ground bond eliminates incoming ground noise and attenuates load-generated common mode noise.

Another major advantage of the system of the invention is lower installation costs. The main breaker is installed in a modular manner with the shunt-trip control, and the distribution breaker is in the same modular enclosure of FIG. 1 rather than having a number of major component installations at various locations inside and outside of the room in which the load resides.

To reiterate, the smaller size provided by the system of this invention enables the transformer to be significantly downsized compared with conventional transformer designs. Spacing required, for example, for the breakers, is smaller because it is part of a packaged system rather than being composed of individual, field-installed components. Because of the smaller size, less heat is generated thereby permitted a tighter shrouding or a more closely fitting enclosure.

All of the above advantages result in lower installed costs. Because of the combined modular construction, the parts themselves cost less and the system costs less than the sum of a piece-parts installation. This also results in lower labor costs because there are less components to be installed and less material needed to complete the installation. Installations are simpler and easier, thereby being faster. Because of the single packaging configuration of the power distribution unit, the time needed for properly locating the entire unit, which previously was in multiple components, is significantly reduced. Finally, reduced heat output reduces the need for special cooling.

The above advantages increase the system's compatibility with personnel areas. A smaller footprint allows installation as part of the electronic system, close to the load, rather than being in a separate room or outside the building. As stated previously, the downsizing of the transformer results in reduced audio sound levels, thereby being much less likely to be objectionable. The reduced heat output allows the use of aesthetically pleasing packaging which result in low heat output that could be bothersome to equipment operators and users in the area.

Until now, low transformer impedance for pulse power applications has been achieved only by oversizing the transformer relative to the peak load. In order to satisfy the requirement that the voltage drop during exposure be in the range of eight percent or less, it was also thought to be necessary to employ a large transformer. And yet, with this invention, which incorporates an undersized transformer as stated, the voltage drop on applying the load is normally within four percent, staying within the range of 0.1 to 10 percent. The "common knowledge" of the industry has been that a low source impedance cannot be combined in a small system size to supply a load whose peak power requirement can range from 10 KVA to as high as 500 KVA. This invention shows that this "common knowledge" is not the final word.

In view of the above description, it is likely that modifications and improvements will occur to those skilled in the art which are within the scope of the accompanying claims.

What is claimed is:

1. Power conditioning apparatus comprising:
   electrical power input connection means;
   low impedance transformer means having input means coupled to said power input means and having output means; and
   power output connection means coupled to said transformer output means and adapted to be coupled to a load having a duty cycle of less than fifty percent;
   said transformer being sized based on impedance, independent of thermal characteristics for high current, low duty cycle applications where instantaneous power requirements are greater than 10KVA, the steady state power rating of said transformer being no more than one-half of the maximum instantaneous power requirement of the load.

2. The apparatus recited in claim 1, and further comprising overload protection means selectively coupled to one of said power input and output connection means.

3. The apparatus recited in claim 2, wherein said overload protection means comprises a thermal switch configured to switch the power from said transformer means when a predetermined temperature of said transformer has been reached.

4. The apparatus recited in claim 2, wherein said overload protection means is a circuit breaker configured to trip due to transformer heat.

5. The apparatus recited in claim 2, wherein said overload protection means comprises a non-thermal overload sensor based on current over a predetermined time period.

6. The apparatus recited in claim 2, wherein said overload protection means comprises a slow-blow circuit breaker with shunt-trip control.

7. The apparatus recited in claim 6, wherein said shunt-trip control comprises a thermal sensor.

8. The apparatus recited in claim 2, wherein said overload protection means comprises circuit breaker means which is oversized compared with the steady state power rating of said transformer means.

9. The apparatus recited in claim 2, wherein said circuit breaker means is sized to be at least fifty percent of the maximum instantaneous power requirement of the load.

10. The apparatus recited in claim 1, wherein the instantaneous voltage drop when the duty cycle of the load is applied to the output of said transformer means ranges from 0.1 and 10 percent.

11. The apparatus recited in claim 1, wherein said transformer means comprises interleaved closely adjacent layers of primary and secondary windings formed of low impedance components.

12. The apparatus recited in claim 1, wherein the duty cycle of the load is less than twenty-five percent.

13. The apparatus recited in claim 1, wherein the duty cycle of the load is about one percent.

14. The apparatus recited in claim 1, and further comprising surge suppressor means coupled with said output connection means.

15. The apparatus recited in claim 1, and further comprising filter means coupled with said output connection means.

16. The apparatus recited in claim 14, and further comprising filter means coupled with said output connection means.

17. The apparatus recited in claim 1, wherein said transformer means is a toroidally wound transformer.

18. The apparatus recited in claim 1, wherein the steady state power rating of said transformer is no more than one-third of the maximum instantaneous power requirement of the load.

19. The apparatus recited in claim 1, wherein the steady state power rating of said transformer is about one-sixth of the maximum instantaneous power requirement of the load.

20. The apparatus recited in claim 1, wherein the instantaneous power requirement of the load range is from 10 KVA to 500 KVA.

21. The apparatus recited in claim 1, wherein the windings of said transformer means are tightly wound to enhance the low impedance characteristics.

22. The apparatus recited in claim 1, wherein said transformer means comprises grain oriented, high permeability iron core elements.

23. A method for providing high purity electrical power to loads having a duty cycle of less than fifty percent where instantaneous power requirements are greater than 10 KVA, said method comprising the steps of:
   applying electrical power to the input of a low impedance transformer sized based on impedance, independent of thermal characteristics, for high current, low duty cycle applications, the steady state rating of the transformer being no more than one-half the maximum instantaneous power requirement of the load and having an output for coupling to the load;
   converting the applied electrical power to the form required by the load to which the transformer is coupled, where the output voltage drop ranges between 0.1 and 10 percent upon drawing power by the load.

24. The method recited in claim 23, and comprising the further step of forming the low impedance transformer by interleaving closely adjacent primary and secondary windings formed of low impedance components.

25. The method recited in claim 23, and comprising the further step of forming the low impedance transformer by tightly winding the primary and secondary windings thereof.

26. The method recited in claim 23, and comprising the further step of forming the low impedance transformer with grain oriented, high permeability iron core elements.

27. The method recited in claim 23, and comprising the further step of selectively coupling overload protection means to one of the input and output of the transformer.

28. The method recited in claim 27, wherein the overload protection means comprises a slow-blow circuit breaker with shunt-trip control.

29. The method recited in claim 28, wherein the shunt-trip control comprises a thermal sensor.

30. The method recited in claim 23, and comprising the further step of switching power from the transformer when a predetermined temperature of said transformer has been reached.

31. The method recited in claim 23, wherein the duty cycle of the load is about on percent.

32. The method recited in claim 23, and comprising the further step of coupling surge suppressor means in the output of the transformer.

33. The method recited in claim 23, and comprising the further step of coupling filter means in the output of the transformer.

34. The method recited in claim 32, and comprising the further step of coupling filter means in the output of the transformer.

35. The method recited in claim 23, wherein the transformer has toroidal windings.

36. The method recited in claim 23, wherein the steady state rating of the transformer is no more than one-third of the maximum instantaneous power requirement of the load.

37. The method recited in claim 23, wherein the steady state rating of the transformer is no more than about one-sixth of the maximum instantaneous power requirement of the load.

38. The method recited in claim 23, wherein the instantaneous power requirement of the load ranges between 10 KVA and 500 KVA.

39. The method recited in claim 23, and comprising the further step of selectively coupling overload protection circuit breaker means in one of the input and output of the transformer, the circuit breaker means being sized to be at least fifty percent of the maximum power requirement of the load.

* * * * *